W. L. STREET.
VEGETABLE WASHING MACHINE.
APPLICATION FILED APR. 10, 1922.
1,428,125. Patented Sept. 5, 1922.
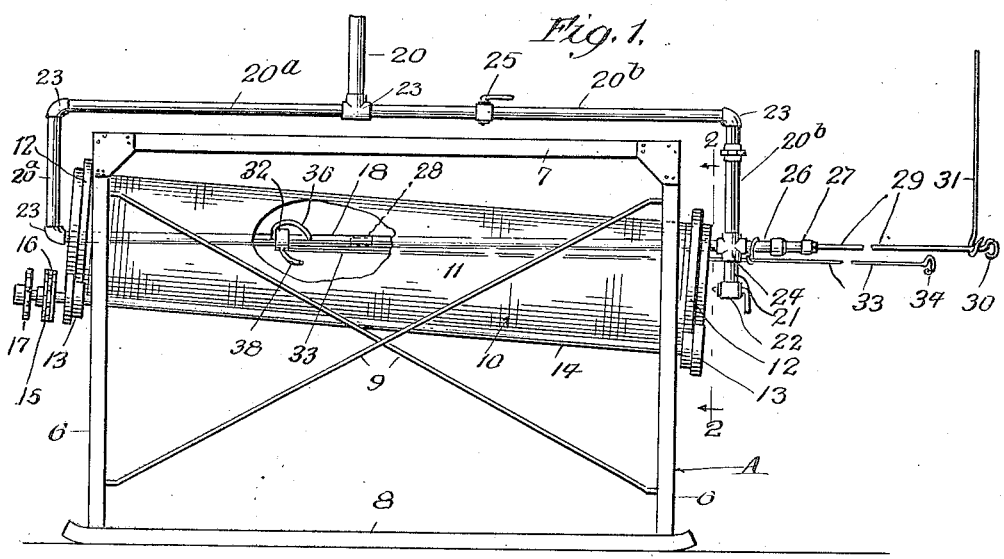
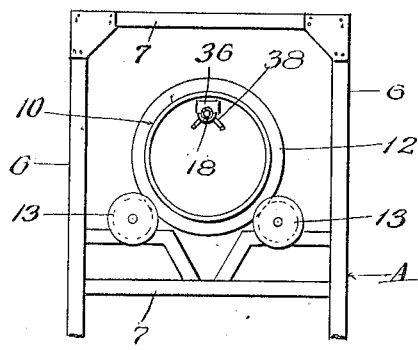
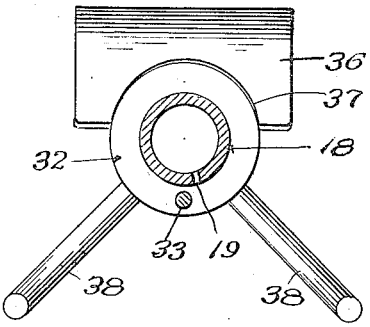
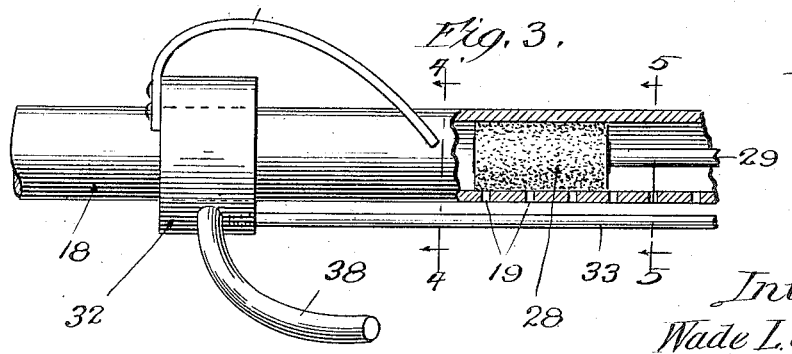
Inventor:
Wade L. Street
by Charles O. Shirey
his Atty.

Patented Sept. 5, 1922.

1,428,125

UNITED STATES PATENT OFFICE.

WADE L. STREET, OF CHICAGO, ILLINOIS, ASSIGNOR TO THE T. A. SNIDER PRESERVE COMPANY, OF CHICAGO, ILLINOIS, A CORPORATION OF ILLINOIS.

VEGETABLE-WASHING MACHINE.

Application filed April 10, 1922. Serial No. 550,990.

*To all whom it may concern:*

Be it known that I, WADE L. STREET, a citizen of the United States, and a resident of Chicago, Cook County, and State of Illinois, have invented certain new and useful Improvements in Vegetable-Washing Machines, of which the following is declared to be a full, clear, and exact description.

This invention relates to vegetable washing machines of that type which employs a perforated water spray pipe, and its principal object is to provide means for cleaning the spray pipe and freeing it from foreign substances, both outside and inside of it. In use, the discharge orifices of the spray pipe become clogged, and vines, weeds and other foreign matter accumulate on the exterior of the spray pipe, thereby greatly interfering with the operation of the washer. The present invention has been designed to remedy this condition, and consists in the several novel features hereinafter fully set forth and claimed.

The invention is clearly illustrated in the accompanying drawing, in which:—

Figure 1 is a side elevation, partly broken out, of a vegetable washer, illustrating one embodiment of the invention applied thereto; Fig. 2 is a cross-section taken on line 2—2 of Fig. 1; Fig. 3 is a detail side elevation, partly broken out, of a fragment of the water spraying pipe, illustrating the cleaning apparatus in connection therewith; Fig. 4 is a detail cross-section taken on line 4—4 of Fig. 3, and Fig. 5 is a detail cross-section, taken on line 5—5 of Fig. 3.

Referring to said drawing, which illustrates a simple embodiment of the present invention, the reference character A designates a frame of strong and substantial construction, comprising upright frame members or legs 6, horizontal frame members 7, 8, and braces 9 between the legs, all secured together in a rigid and substantial manner.

Rotatively mounted on said frame is an inclined cylindrical drum or screen 10, open at its ends, and as a preference formed of coarse mesh wire material 11, and hoops or rims 12. The rims rest and run on flanged rollers 13, which are mounted on inclined shafts 14 journalled in bearing boxes carried by the frame. The shafts are connected by a sprocket chain 15 trained around sprocket wheels 16 on the shafts 14, and one of said shafts bears a sprocket wheel 17, which may be connected to the driving sprocket wheel of any suitable driving mechanism.

Extending through the hollow of the cylindrical drum or screen 10 is a water spray pipe 18, which is formed with small discharge orifices 19 through which water is sprayed upon the vegetables contained in the drum or screen. Both ends of said spray pipe are connected to a water supply pipe 20 by branch pipes $20^a$, $20^b$, and suitable fittings 23, 24. A valve 25 is interposed in the branch pipe $20^b$, which during the operation of the washer is kept closed. In the operation of the washer just described, the vegetables are delivered into the upper end of the inclined rotating drum or screen 10, and the water is sprayed upon the vegetables as they tumble and roll down the inclined drum or screen. The washed vegetables are discharged from the lower end of the drum or screen to be subsequently dealt with.

From the bottom of the fitting 24 extends a short drain pipe 21, which is normally closed by a valve 22 at its lower end and extending out from the end of the fitting 24, in line with the spray pipe 18 is a short piece of pipe 26, on the end of which is a stuffing box 27 and, normally contained in said short piece of pipe 26 is a cylindrical brush 28, which is fastened on the end of a long rod 29 which protrudes out through the stuffing box 27 and has a handle 30 on its end. Its protruding free end may be supported by a hook 31 or by any other convenient means. To clean the interior of the spray pipe, in case the discharge orifices thereof become clogged, the valve 25 is opened and the brush 28 moved back and forth in the spray pipe. The valve 25 is thereupon closed and the brush 28 drawn back into the pipe extension 26.

Surrounding the spray pipe and slidably mounted thereon is a collar 32 to which is connected a long rod 33 which has a handle 34 on its outer end. A hook secured on the pipe 26 furnishes means for supporting the free end of the rod 33. Secured to the collar 32 is a scraper 36 which may comprise a plate or piece of sheet metal bent toward the discharge end of the machine and down against the spray pipe 18. Its free edge is formed with a notch 37 whereby it may straddle and engage the outer face of the pipe 18. Secured to and projecting from the collar 32 opposite the scraper 36 are horns or prongs 38 which diverge and extend downward and toward the discharge end of the drum. Said horns or prongs 38 may be formed of short pieces of wire or rod, secured to the collar. The collar, scraper and prongs form a cleaner that may be actuated from without the drum by the rod 33.

To clean and clear the exterior of the spray pipe 18 from the accumulation of vines, weeds and other foreign matter, the cleaner is drawn back and forth along the pipe. By properly manipulating the rod 33, the attendant can turn the collar 32 upon the pipe and thereby present the scraper 36 to different parts of its surface. Likewise, the horns 38 may be presented at different places around the pipe, and, consequently, all of the foreign matter may be scraped off the pipe, and vines, weeds and so forth that are caught by the screen and hang in the interior of the drum may be gathered and drawn to the discharge end of the drum and removed. Obviously, the interior brushing and exterior scraping operations may be performed at the same time, or either by itself may be performed alone. The spray pipe may thereby be kept in a clean state. The machine is particularly useful in washing tomatoes, although it may be used for washing other vegetables or fruits.

More or less variation of the exact details of construction is possible without departing from the spirit of this invention; I desire, therefore, not to limit myself to the exact form of the construction shown and described, but intend in the following claims to point all of the invention disclosed herein.

I claim as new and desire to secure by Letters Patent:

1. In a vegetable washer, a frame, an inclined cylindrical screen rotatively mounted thereon, a water spray pipe extending lengthwise through the interior of the screen and having an extension projecting beyond the same, and having discharge orifices only along that part of its length which is contained in the screen, a main water supply pipe connected to said water spray pipe, a stuffing box, on the extended end of said water spray pipe, a rod extending through said stuffing box into said spray pipe, and a cylindrical brush in said spray pipe mounted on said rod, said brush being movable into the extended end of said spray pipe substantially as and for the purpose set forth.

2. In a vegetable washer embodying a rotatory cylindrical screen and a perforated water spray pipe, a collar rotatively and slidably mounted on said spray pipe, a pipe cleaning implement secured to said collar, and an actuating rod to which said collar is attached.

3. In a vegetable washer embodying a rotatory cylindrical screen and a perforated water spray pipe, a collar rotatively and slidably mounted on said spray pipe, a pipe scraper secured to said collar and having a notched portion in its scraping edge contacting with the pipe, and an actuating rod to which said collar is attached.

4. In a vegetable washer embodying a rotatory cylindrical screen and a perforated water spray pipe, a collar rotatively and slidably mounted on said spray pipe, a pipe scraper and prongs secured to said collar and an actuating rod to which said collar is attached.

WADE L. STREET.